(No Model.)
W. V. KAY.
BUCKLE.
No. 347,114. Patented Aug. 10, 1886.
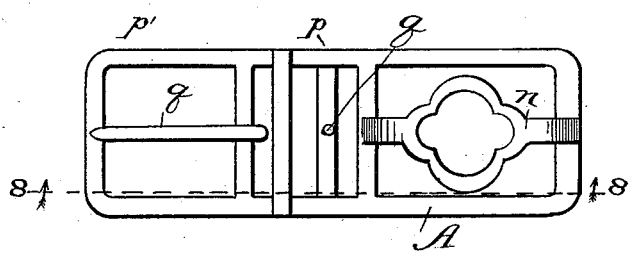
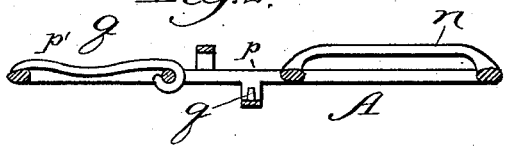
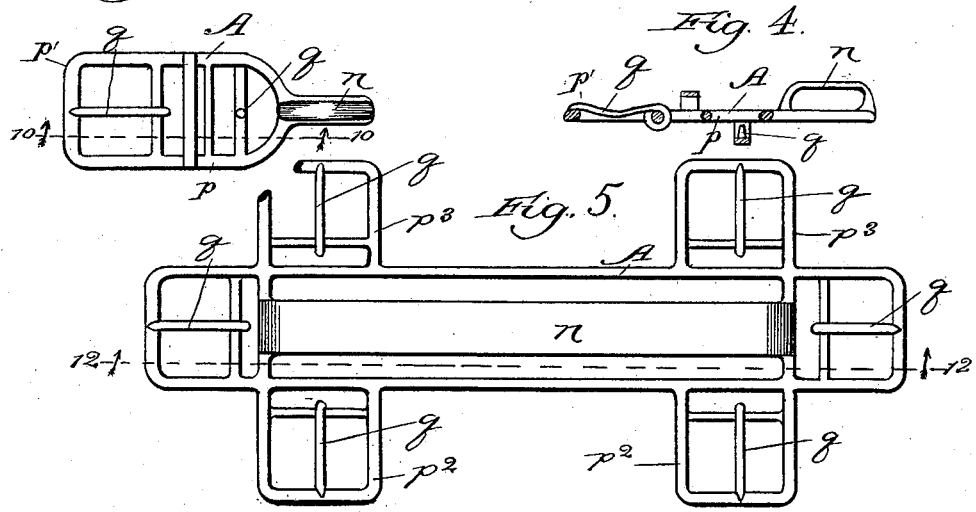
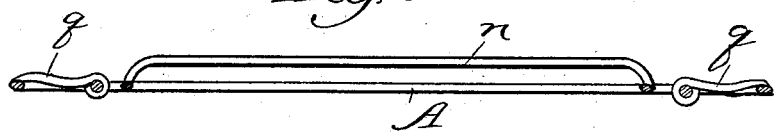
Witnesses:
Chas. E. Gaylord.
Frank L. Hauglas.
Inventor:
William V. Kay,
By Dyrenforth & Dyrenforth,
Attys.

UNITED STATES PATENT OFFICE.

WILLIAM V. KAY, OF BELTON, TEXAS.

BUCKLE.

SPECIFICATION forming part of Letters Patent No. 347,114, dated August 10, 1886.

Application filed April 6, 1886. Serial No. 197,930. (No model.)

*To all whom it may concern:*

Be it known that I, WILLIAM V. KAY, a citizen of the United States, residing at Belton, in the county of Bell and State of Texas, have invented a certain new and Improved Combined Buckle and Hip-Strap Bearer; and I hereby declare the following to be a full, clear, and exact description of the same.

It is my object to provide a device to be applied upon the rump of the animal for the purpose of attachment of the back-strap, the trace-bearers or breeching-straps, and the crupper-strap without sewing.

My device comprises, essentially, a frame carrying a buckle for the attachment of the back-strap and one for the attachment of the crupper, and a loop for retaining the trace or breeching carrying straps or hip-straps.

In the drawings, Figure 1 shows my improved construction in its preferred form. Fig. 2 is a sectional view taken on the line 8 8 of Fig. 1; Fig. 3, a plan view of one slight modification; Fig. 4, a sectional view taken on the line 10 10 of Fig. 3; Fig. 5, a plan view of another modified construction, to adapt the device for use with a heavy harness, in which two hip-straps are used on each side to support the breeching, and to provide for the use of continuous or of separate short hip-straps; and Fig. 6, a sectional view taken on the line 12 12 of Fig. 5.

A is the frame, carrying, essentially, two buckles, $p$ and $p'$, in line with each other, one by preference having a loose tongue, $q$, and the other a speed-tongue, $q$—the former to afford means for attaching the back-strap, which runs back from the pad or hames, and the latter to afford means for attaching the crupper. A loop device, $n$, is provided on the frame A to retain the hip-straps, which comprise a continuous strap extending through the loop from one side of the animal to the other, though provision is made in the modified construction shown in Fig. 5 for securing, also, separate short hip-straps for each side of the animal by providing lateral buckles $p^2$ and $p^3$.

In using the construction shown in Fig. 5, which is for use with a heavy harness, where two straps are used on each side of the animal to carry the breeching, the straps, when continuous, may pass through the buckles $p^2$ and $p^3$ and under the loop $n$, the buckles of the last named modification being provided with loose tongues, as shown, or speed-tongues, if preferred.

The device constructed as shown in Fig. 3 is rendered particularly adaptable for light buggy-harness, wherein the breeching-strap is usually round, and differs from the construction shown in Fig. 1 in being of lighter construction than the latter.

What I claim as new, and desire to secure by Letters Patent, is—

1. A combined buckle and hip-strap bearer comprising in combination a frame, A, having a crupper-buckle, $p$, and a back-strap buckle, $p'$, in line with each other, and a loop, $n$, for continuous hip-straps, substantially as described.

2. A combined buckle and hip-strap bearer comprising in combination a frame, A, having a crupper-buckle, $p$, and a back-strap buckle, $p'$, in line with each other, a loop, $n$, for continuous hip-straps, and additional lateral buckles, $p^2$ and $p^3$, substantially as and for the purpose set forth.

WM. V. KAY.

In presence of—
    H. C. CASSIDY,
    C. D. KAY.